United States Patent
Stieler

(10) Patent No.: US 6,634,679 B1
(45) Date of Patent: Oct. 21, 2003

(54) FLUID QUICK CONNECTOR WITH RETENTION CLIP FOR FLANGELESS ENDFORMS

(75) Inventor: David C. Stieler, Lake Orion, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/124,533

(22) Filed: Apr. 17, 2002

(51) Int. Cl.[7] .............................................. F16L 37/00
(52) U.S. Cl. ...................... 285/308; 285/319; 285/340
(58) Field of Search ................................. 285/305, 308, 285/319, 921, 340

(56) References Cited

U.S. PATENT DOCUMENTS

| | | | |
|---|---|---|---|
| 4,919,457 A | 4/1990 | Moretti | 285/39 |
| 5,292,157 A | 3/1994 | Rubichon | 285/39 |
| 5,366,262 A | 11/1994 | Couvreur | 285/340 |
| 5,863,077 A * | 1/1999 | Szabo et al. | 285/921 |
| 5,873,610 A * | 2/1999 | Szabo | 285/308 |
| 5,895,078 A * | 4/1999 | Le Clinche | 285/305 |
| 6,139,214 A * | 10/2000 | Zirps et al. | 403/325 |
| 6,206,435 B1 * | 3/2001 | Le Clinche | 285/305 |
| 6,293,596 B1 * | 9/2001 | Kinder | 285/305 |
| 6,371,529 B1 * | 4/2002 | Szabo et al. | 285/319 |
| 6,431,612 B1 * | 8/2002 | Walker et al. | 285/305 |

* cited by examiner

Primary Examiner—David Bochna
(74) Attorney, Agent, or Firm—Young & Basile, P.C.

(57) ABSTRACT

A fluid quick connector includes a connector housing having a through bore adapted to receive a tubular endform. A retainer is transversely mountable through the connector housing into engagement with the endform. A retention clip having at least one angled end projection is carried on the retainer for movement to a final latched position with the endform while enabling the endform to be inserted into the connector housing without substantial contact with the retention clip. The retention clip is in the form of a planar body having at least one angled projection extending therefrom. Preferably, a plurality of angled projections are formed on the retention clip. The retention clip is fixedly secured to the retainer or insert molded in the retainer for movement concurrent with movement of the retainer relative to the connector housing.

15 Claims, 2 Drawing Sheets

FLUID QUICK CONNECTOR WITH RETENTION CLIP FOR FLANGELESS ENDFORMS

BACKGROUND OF THE INVENTION

The present invention relates, in general, to fluid quick connectors which couple two fluid operative components together.

Snap-fit or quick connectors are employed in a wide range of applications, particularly, for joining fluid carrying conduits in automotive and industrial application. Such quick connectors utilize retainers or locking elements for securing a first connector component, such as a tubular conduit, within a complimentary bore of a second connector component or housing. Such retainers are typically of either the axially-displaceable or radially-displaceable type. The terms "axially-displaceable" or "radially-displaceable" are taken relative to the axial bore through the second component.

In a typical quick connector with an axially displaceable retainer, the retainer is mounted within a bore in a housing of the second connector component of housing. The retainer has a plurality of radially and angularly extending legs which extend inwardly toward the axial center line of the bore in the housing. A tube or male component to be sealingly mounted in the bore in the second component includes a radially upset portion or flange which abuts an inner peripheral surface of the retainer legs. Seal and spacer members as well as a bearing or top hat are typically mounted in the bore ahead of the retainer to form a seal between the housing and the first connector component when the first connector component is lockingly engaged with the retainer legs in the housing.

Radially displaceable retainers are also known in which the retainer is radially displaceable through aligned bores or apertures formed transversely to the main throughbore in the second connector component housing. The radially displaceable retainer is typically provided with a pair of depending legs which are sized and positioned to slip behind the radially upset portion or flange on the first component or conduit only when the conduit is fully seated in the bore in the second component. This ensures a positive locking engagement of the conduit with the second component as well as providing an indication that the conduit is fully seated since the radially displaceable retainer can be fully inserted into the second component only when the conduit has been fully inserted into the bore in the second component.

In other types of quick connectors used with flangeless endforms, a clip in the form of an annular ring is provided in the second connector housing and has a plurality of angularly extending fingers projecting from the inner diameter of the ring. The fingers are angled to allow easy insertion of an endform and the conduit into the housing through the fingers. However, a reverse movement in the direction to separate the endform from the housing causes the fingers to dig into the exterior wall of the endform to resist and provide pull-out force resistance to tend to maintain the endform in the second connector housing.

In such an endform, the retention clip is held in the housing by means of a retainer, such as an axially insertable retainer which is inserted into the open end of the second connector housing after the retention clip has been inserted into the second connector bore.

However, while such retention clips provide a means for securing a flangeless endform or tube in a connector housing, they necessarily represent a separate member which increases the assembly time of the connector assembly. More importantly, the angled fingers on the retention clip dig into and scrape the exterior surface of the endform while the endform is being inserted into the connector housing. This may remove the protective coating normally found on metal tubes which could lead to corrosion and an eventual breakdown or leak through the quick connector.

Thus, it would be desirable to provide a quick connector retention means which overcomes the problems of previously devised retention means used in quick connectors for flangeless endforms. It would also be desirable to provide a quick connector retention means for flangeless endforms which does not require excessive modification of existing quick connector designs. It would also be desirable to provide a quick connector retention means which minimizes damage to the endform during insertion into the connector housing. It would also be desirable to provide a quick connector retention means which reduces the number of separate components required in the quick connector assembly. It would also be desirable to provide a quick connector retention means which is operative only on movement of a quick connector retainer to a last position in the quick connector housing.

SUMMARY OF THE INVENTION

The present invention is a fluid quick connector with a retention clip for securing a flangeless endform to a connector housing.

In one aspect, the fluid quick connector includes a housing having a through bore extending between opposed first and second ends, the endform insertable into the bore through the first end of the housing. The second end of the housing is attachable to a fluid operative element.

The retention clip has at least one radially extending projection adapted to engage the endform to prevent movement of the endform opposite to an insertion direction of the endform into the housing bore.

A retainer is mountable in the housing. The retention clip is carried by the retainer for movement between a first position spaced from an insertion path of the endform into the bore in the housing, and a second position concurrent with movement of a retainer to a second position engaged with the endform.

In one aspect the retention clip is unitarily carried with the retainer. The retention clip has a first portion fixed to the retainer, and at least one projection cantilevered from the first portion into the bore in the housing.

In another aspect the retention clip is fixedly joined to the retainer.

In this aspect, the retention clip is insert molded in the retainer, which the at least one projection extending from the retainer into the bore in the housing when the retainer is in the second mounting position.

The retention clip includes a planar body having a first end fixed to the retainer, the at least one projection extending from the first end. The end portion of the retainer extends transverse to the housing bore.

In another aspect, the retention clip includes at least a first leg depending from the end portion of the retainer body.

In one aspect the retention clip includes:
at least one end fixed to the retainer;
a pair of legs extending from the end; and
the projection formed on at least one of the end and the legs, the at least one projection is carried on at least one of the side legs.

Preferably at least one projection comprises a plurality of projections, at least one of the plurality projections carried on each of the end and each of the legs.

Alternately the at least one projection includes a plurality of projections, at least one of the plurality projections carried on each of the end and each of the legs of the retention clip.

An inner end of the projection(s) is disposed at a diameter less than the outer diameter of the endform.

In one aspect, the projection on the retention clip has an inner end. The retainer is mountable in the housing in a temporary mounting position allowing insertion of the endform into the bore in the housing without substantial contact between the inner end of the projection and the endform.

In another aspect the at least one projection has an inner end disposed at a predetermined, non-perpendicular angle with respect to the endform. Preferably the inner end of the at least one projection is angled toward the second end of the housing.

The fluid quick connector of the present invention provides an expedient and simplified connection between connector body having a transversely moveable retainer and a flangeless endform while at the same time preventing engagement between a retention clip carried on the retainer and the endform during insertion of the endform into the housing. This minimizes possible damage to the protective coating which may be applied to the exterior surface of the endform by preventing engagement between the sharp edges of the retention clip and the endform while the endform is being inserted into the quick connector housing. However, the lock fingers on the retention clip are moveable into engagement with the endform during transverse movement of the retainer into a fully locked position in the connector housing. The angled ends of the lock fingers prevent axially outward separation of the endform.

The retention clip and retainer configuration of the present invention enables a retainer and a quick connector housing suited for use with endforms having annular beads or flanges to be uniquely used with a flangeless endform while still providing all the necessary sealed locking of the endform in the connecting housing. These advantages are achieved without significant modification to the retainer and connector housing.

BRIEF DESCRIPTION OF THE DRAWING

The various features, advantages and other uses of the present invention will become more apparent by referring to the following detailed description and drawing in which.

DETAILED DESCRIPTION

Figure 1:
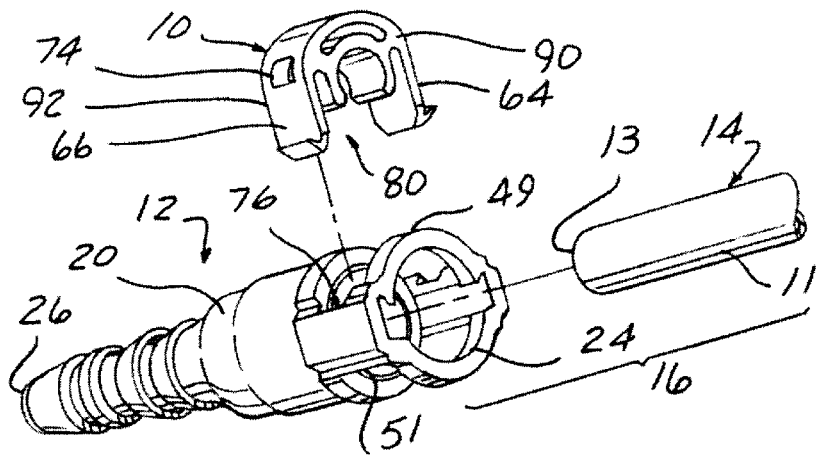
FIG. 1 is an exploded, perspective view of a quick connector carrying a first aspect of a retention clip according to the present invention.

For clarity in understanding the use and operation of the present invention, reference will first be had to FIGS. 1–5 which depict a retainer 10 which lockingly couples first and second components 12 and 14, respectively, of a fluid quick connector 16.

The following description of the first connector component or element 12 is by way of example only as the first connector component 12 may have any suitable shape typically found in quick connectors.

Further, the following description of the use of the fluid quick connector to connect the second component 14; such as a tubular member to the first component 12 will be understood to apply to the connection of conduits, hoses, and/or solid metal or plastic tubes to each other in fluid flow communication. The end of a conduit or tubular member inserted into the interior of one end of the quick connect will be defined as an endform. The endform can be a separate member which receives a separate hose or conduit at one end or a shape integrally formed on the end of an elongated metal or plastic tube. Further, the endform can be integrally formed on or mounted as a separate element to a fluid use device, such as a pump, filter, etc., rather than as part of an elongated conduit.

The present quick connector finds advantageous use with tubular members, such as conduits, tubes, or hoses which are capable of defining a continuous electrically conductive path through the tubular member itself or through a conductive layer or portion of the tubular member. For example, conductive layers have been provided in multi-layer tubes as disclosed in U.S. Pat. Nos. 5,524,673, and 5,743,304. Reference is made to these conductive layers which provide an electrically conductive path from the quick connector of the present invention to a remote electrical ground to dissipate static electric charges which can build up within the fuel system due to fast flowing fluids, such as vehicle fuels.

Figure 5:
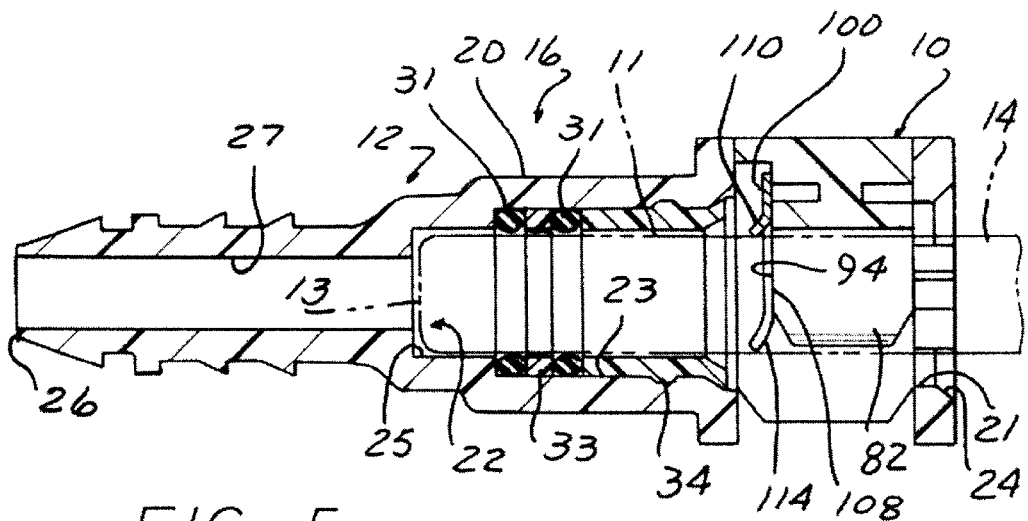
FIG. 5 is a cross sectional view generally taken along line 5—5 in FIG. 4.

The first component 12 includes a housing 20 having an elongated, axially extending, internal stepped bore 22, shown in detail in FIG. 5, extending from a large diameter first, open end 24 to a smaller diameter, second open end 26. The stepped bore 22 includes a first bore portion 21 extending from an opening at the first end 24 of the housing 20 to a second smaller diameter second stepped bore portion 23. A third yet smaller diameter stepped bore portion 25 extends axially from one end of the second stepped bore portion 23 and communicates to a still smaller fourth stepped bore portion 27 which extends to the open second end 26 of the housing 20.

As is conventional, a top hat or bearing 34 is mounted in the second stepped bore portion 23 immediately adjacent the end of the first bore portion 21. A seal means 30 is also mounted in the second stepped bore portion 23 between one end of the top hat 34 and the third stepped bore portion 25.

The inner diameter of the first stepped bore portion 21 is sized to slidably receive the outer diameter of the radially enlarged flange or upset bead 18 formed on the second component or fitting 14. Further, the inner diameters of the seal means 30 and the top hat 34 are sized to sealingly engage the outer diameter of the end portion 11 of the second component 14 extending from the radially enlarged flange 18 to the tip end 13 of the second component 14. The third stepped bore portion 25 has an inner diameter sized to snugly engage the outer diameter of the end portion 11 of the second component 14 when the second component 14 is fully inserted into the stepped bore 22 as described hereafter. The seal means 30 is formed, by example, of at least one and preferably two O-rings 31 which are separated by a rigid, annular spacer 33.

Figure 3:
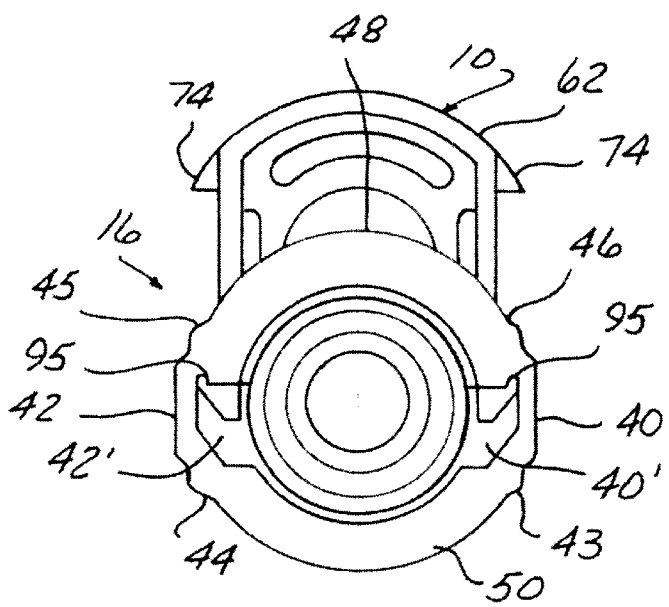
FIG. 3 is an end view of the quick connector and retainer, with the retainer shown in a partially inserted, storage position.
Figure 4:
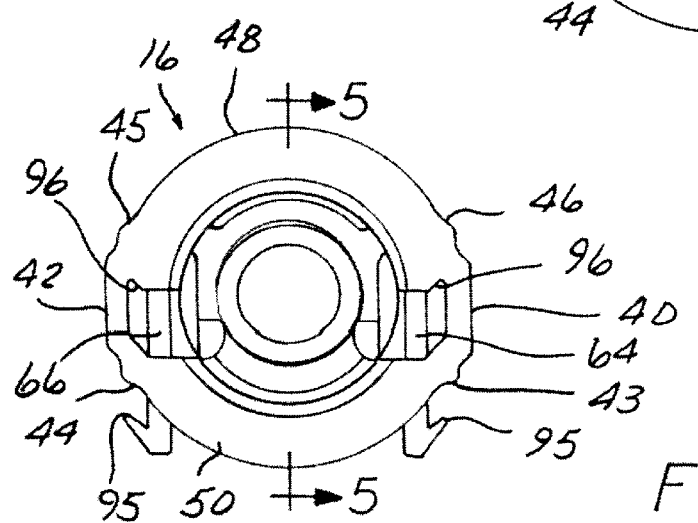
FIG. 4 is an end view of the quick connector and retainer, with the retainer depicted in a fully inserted, position in the female component.

As shown in FIGS. 1, 3, and 4, the first end 24 of the housing 20 is formed with a pair of opposed, exterior flat surfaces 40 and 42. The flat surfaces 40 and 42 are diametrically opposed on the first end 24 and may be centrally located on each diametrical side of the first end 24. The adjacent surfaces of the housing 20 to one side of the flat surfaces 40 and 42 form an opposed pair of lock surfaces or flats, such as a first flat 43 and a second flat 44. A second pair of flats 45 and 46 are formed on the housing 20 or the other side of the flat surfaces 40 and 42. The flats 43 and 44 extend axially a short distance from the first end 24 of the housing 20. Opposed surfaces 48 and 50 of the first end 24 of the housing 20 between the flats 43 and 44 and the flats 45 and 46 have a generally arcuate shape as shown in FIGS. 3 and 4. Apertures 49 and 51 are formed respectively in each surface 48 and 50. The apertures 49 and 51 are aligned to form a transverse bore extending through the first end 24 of the housing 20 which is disposed in communication with the first bore portion 21 in the housing 20.

The retainer 10, described hereafter, is by way of example only as other radially-displaceable retainer designs having side locking projections may also employ the release tool of the present invention.

The retainer 10 is formed of a one-piece body of a suitable plastic, such as a thermoplastic, for example, and has an end wall 62 formed of a generally curved or arcuate shape, by way of example only, and first and second spaced side legs 64 and 66. The side legs 64 and 66 extend generally parallel to each other from opposite ends of the end wall 62. Further, each side leg 64 and 66 has an outer end 72, although it is also possible to connect the side legs 64 and 66 at a lower portion by an arcuate member.

A pair of projections 70 extend along the length of the retainer 10 between opposed side edges of the side legs 64 and 66, respectively. The projections 70 are located adjacent the outer end 72 of each leg 64 and 66. The projections 70 engage surfaces on the housing 20 to position the retainer 10 in the shipping position shown in FIG. 3, or in the fully inserted, latched position shown in FIGS. 4, 5 and 6.

Further, a pair of outward extending lock tabs or edges 74 are formed adjacent the end wall 62 on each side leg 64 and 66.

As shown in FIGS. 1–5, the retainer 10 includes a tubular member receiving means 80 which is preferably carried as an integral, one-piece part of the retainer 10. The receiving means 80 includes first and second depending arms 82 and 84 which extend from a boss or enlargement 86 integrally formed on the inner surface of the end wall 62 of the retainer 10. An inverted, U-shaped slot 88 is formed on the inner surfaces of the arms 82 and 84 and the boss 86 which is sized to snugly conform to the outer diameter of the tubular portion 11 of the second component 14. The outer ends 91 of each of the arms 82 and 84 are angled or tapered to act as a guide surface to assist in sliding movement of the arms 82 and 84 over the tubular end 11 of the second component 14.

Figure 2:
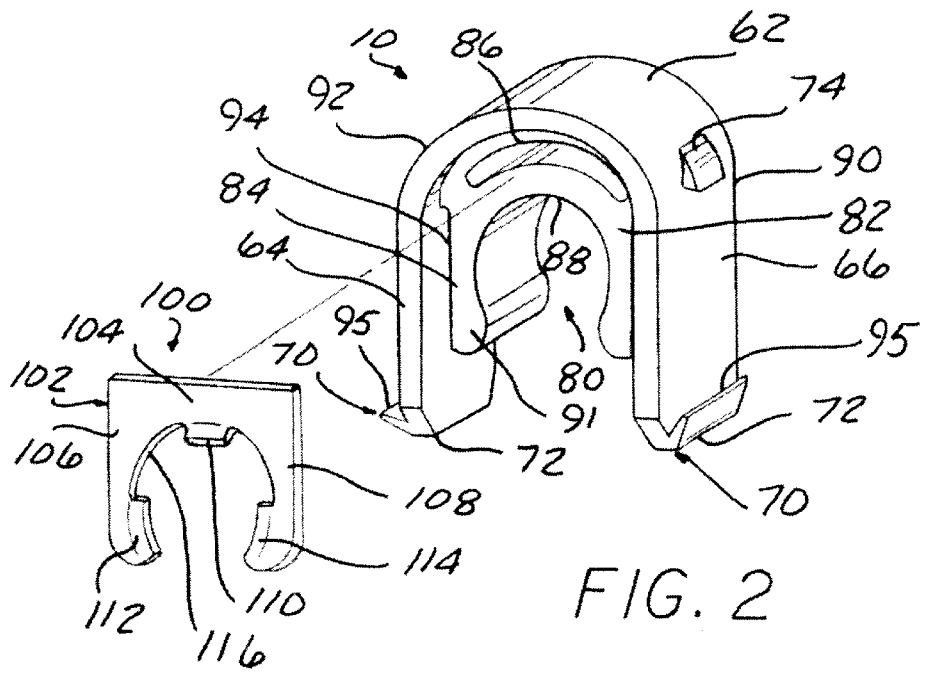
FIG. 2 is an enlarged, exploded, perspective view of the retainer shown in FIG. 1.

As shown in FIGS. 1 and 2, each of the arms 82 and 84 extends from one side end contiguous with a first side end 90 of the retainer 10 to an opposed side end contiguous with a second side end 92 of the retainer 10.

As shown in FIGS. 1, 2, 3 and 4, the projections 70 on the legs 64 and 66 of the retainer 10 are formed with an angled hook-like shape terminating in a tip 95. The tip 95 is disposed at an acute, upturned angle with respect to the corresponding legs 64 and 66.

Similarly, as shown in FIGS. 3 and 4, the grooves 40' and 42' are formed in the interior of the flat surfaces 40 and 42, respectively, and include a recess or notch 96 at one end which is shaped complimentary to the shape of the tip 95 of the projection 70 on each of the legs 64 and 66 of the retainer 10. In this manner, pull out of the retainer 10 from the housing 20 is resisted by the interlocking tips 95 on the legs 64 and 66 of the retainer 10 which are seated within the notches 96 in the grooves 40' and 42' in the housing 20 as shown in the partially inserted, shipping position of the retainer 10 in FIG. 3. The flats or lock edges 44 and 46 are disposed at an angle complimentary to the acute angle of the tips 95 on the legs 64 and 66 of the retainer 10. This enables interlock of the tips 95 with the flats 44 and 46 resists pull out of the retainer 10 from the housing 20 from the fully latched position shown in FIG. 4.

The hook shaped tips 95 on the legs 64 and 66 of the retainer 10 in conjunction with the grooves 40' and 42' in the housing 20 also provide, a distinct, "avalanche effect" snap action of the retainer 10 in the housing 20. The grooves 40' and 42' in the housing 20 are formed in generally planar flat surfaces. The inner surfaces force the ends 72 of the legs 64 and 66 laterally inward toward each other when the retainer 10 is inserted into the housing 20. When the tips 95 clear one edge of the grooves 40' and 42', the resilient nature of the legs 64 and 66 snaps the ends 72 and the tips 95 laterally outward to create an "avalanche effect" which provides a distinct tactile feedback to the user indicating that the retainer has lockingly engaged the housing 20 in either the partially inserted position shown in FIG. 3 or the fully inserted position shown in FIG. 4.

It should be noted that further insertion force on the retainer 10 moving the retainer 10 from the partially inserted position shown in FIG. 3 to the fully inserted position shown in FIG. 4 again causes the end 72 of the legs 64 and 66 to be urged laterally inward when the tips 95 of the legs 64 and 66 slide along the lower portion of the inner surfaces. When the tips 95 clear the outer end of the inner surfaces, the legs 64 and 66 spring laterally outward in a distinct "avalanche effect" manner. The lower ends of the grooves 40' and 42' are angled to enable the tips 95 to slide out of the grooves 40' and 42' toward the fully latched position.

The retainer 10 can be first be installed on the housing 20 in a shipping or storage position as shown in FIG. 3. In this position, the projections 70 on the side legs 64 and 66 of the retainer 10 snap into and engage the longitudinally extending grooves 40' and 42'.

further insertion of the retainer 10 through the aligned apertures 49 and 51 in the housing 20 causes the ends 72 of the legs 64 and 66 to pass along the lower portion of the inner surfaces of the flat surfaces 40 and 42 until the tips 95 clear the ends of the surfaces and then snap outward exteriorly of the outer surface of the first end 24 of the housing 20 as shown in FIG. 4. In this fully inserted position of the second component 14 in the first component 12, an opening is formed between the arms 82 and 84 of the retainer 10 and the shoulder between the first and second bore portions 21 and 23. This position represents the fully latched position in which the second component 14 is fully seated in the first component 12.

One aspect of a retention clip 100 is disposed in the opening between the retainer 10 and the shoulder between the first and second bore portions 21 and 23 in the housing 20. As shown in FIGS. 2 and 5, the retention clip 100 is in the form of a rigid one piece body 102 preferably of a strong material, such as metal or plastic. The body 102 has an end wall or portion 104 from which opposed side legs 106 and 108 project. At least one lock finger, or projection tab 110 is formed on the body 102, preferably as an integral part of the body 102. By example only, the at least one finger 110 is illustrated as extending from a central portion of the end 104 intermediate the side legs 106 and 108. Optionally, and for additional retention force, lock fingers or tabs 112 and 114 formed on the ends of the side legs 106 and 108, respectively.

All of the lock fingers 110, 112 and 114 project radially inward into the opening 116 formed between the side legs 106 and 108 and the end 104. The inner diameter of the opening 116 between the radially inner surfaces of the lock fingers 110, 112 and 114 is slightly smaller than the outer diameter of the endform 14.

As shown in FIG. 5, each lock finger, such as lock finger 114, is formed at an angle to the plane of the end 104 and the side legs 106 and 108 of the body 102. This angle extends the lock fingers 110, 112 and 114 in a direction of the insertion direction of the endform 14 into the housing 20 or from the right to the left in the orientation of the quick connector 16 shown in FIG. 5. The angle of each lock finger 110, 112 and 116 with respect to the plane of the body 102 determines to some extent the amount of pull-out force exerted by the retention clip 100 on the endform 14 resisting pull-out of the endform 14 from the housing 20. Greater angles provide less pull-out force resistance than do shallower angles.

To simplify the assembly of the retention clip 100 and the retainer 10 to the quick connector 16, the retention clip 100 is preferably mounted on and carried with the retainer 10. For example, the end 104 and adjoining portions of the side legs 106 and 108 may be adhesively joined to the one end face of the arms 82 and 84 and the boss 86 of the retainer 10.

Figure 6:
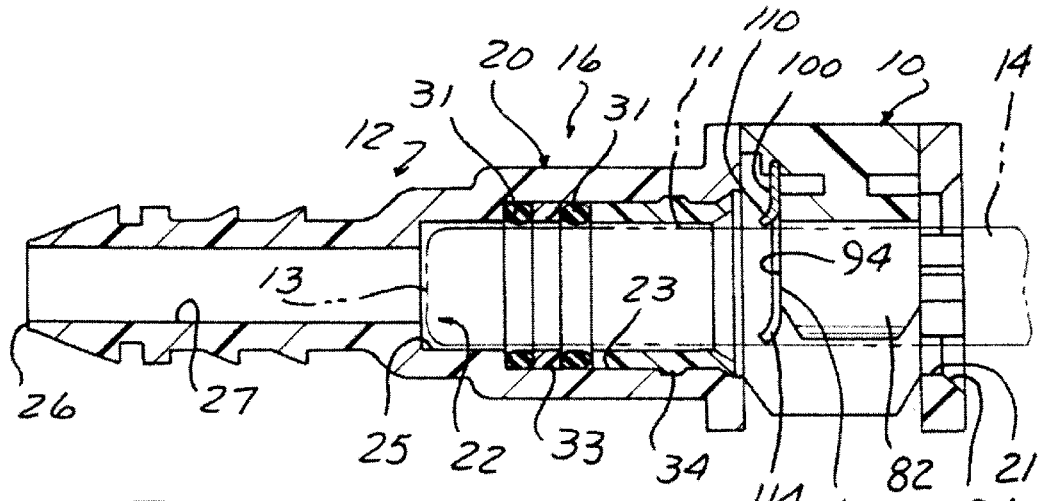
FIG. 6 is a cross sectional view similar to FIG. 5; but depicting another aspect of the retainer and retention clip of the present invention.

An alternate mounting configuration of the retention clip 100 on the retainer 10 is shown in FIG. 6. In this aspect of the invention, at least the end 104 and possibly the adjoining end portions of the side legs 106 and 108 are insert molded in the retainer 10 during the formation of the retainer 10, such as in an end portion of the boss 86. This positions the side legs 106 and 108 along the end surface of the arms 82 and 84 with the lock fingers 110, 112 and 114 projecting angularly therefrom as shown in FIG. 6.

Both aspects of the mounting of the retention clip 100 to the retainer 10 shown in FIGS. 5 and 6 operate in the same manner. Initially, the retainer 10 is deployed in the temporary storage position shown in FIG. 3. In this position, the ends of the side legs 106 and 108 will be spaced from an insertion opening in the housing 20 for the endform 14 thereby allowing the endform 14 to be easily inserted past the retention clip 100 without any significant contact of the lock fingers 110, 112 and 114 on the retention clip 100 thereby preventing any scraping of the protective coating which may be from the exterior surface of the endform 14.

When the endform 14 is fully inserted into the bore 22 in the housing 20, the retainer 10 can be urged to the fully latched position shown in FIGS. 4–6. In this position, the lock fingers 110, 112 and 114 engage the exterior surface of the endform 14. The angular disposition of the lock fingers 110, 112 and 114 resist axial pull-out or separation of the endform 14 from the housing 20 in a direction to the right in the orientation shown in FIGS. 5 and 6.

To separate the endform 14 from the housing 20, the retainer 10 is moved to the temporary storage position shown in FIG. 3 or completely separated from the hosing 20. The enables the endform 14 to be separated without damage from engagement with the edges of the lock fingers 110, 112 and 114.

In summary, there has been disclosed a unique fluid quick connector with a retainer carrying a retention clip releasably engageable with a flangeless endform which operates to secure the endform in the quick connector housing with sufficient pull-out force resistance to prevent undesired separation of the endform from the housing. The retainer is moveable between a temporary, storage position in the quick connector housing to a fully inserted, locking position in the housing. In the temporary storage position of the retainer, the retention clip is spaced from an insertion path of the endform into the quick connector housing. This minimizes damage to the exterior protective coating on the endform caused by engagement with the sharp edges of the lock fingers on the retention clip.

The present retention clip uniquely enables transversely moveable retainers in fluid quick connectors to be used to lockingly engage flangeless endforms in a quick connector housing. At the same time, the retention clip does not require modification to existing transversely mounted retainer and quick connector designs to accommodate the mounting of the retention clip on the retainer.

What is claimed is:

1. In combination with an endform having a substantially constant first outer diameter surface, a fluid quick connector comprising:
    a housing having a through bore extending between opposed first and second ends, the endform adapted to be insertable into the bore through the first end of the housing;
    a retention clip having at least one outwardly extending projection adapted to engage the outer diameter surface of the endform to prevent movement of the endform opposite to an insertion direction of the endform into the bore in the housing; and
    a retainer transversely mountable in the housing, the retention clip carried by the retainer for movement between a first position spaced from an insertion path of the endform into the bore in the housing, and a second position, concurrent with movement of the retainer to a second position, engaged with the endform.

2. The fluid quick connector of claim 1 wherein:
the retention clip is unitarily carried with the retainer.

3. The fluid quick connector of claim 2 wherein:
the retention clip has a first portion fixed to the retainer, the at least one projection cantilevered from the first portion.

4. The fluid quick connector of claim 2 wherein:
the retention clip is fixedly joined to the retainer.

5. The fluid quick connector of claim 4 wherein:
the retention clip is insert molded in the retainer, the at least one projection extending from the retainer into the bore in the housing when the retainer is in the second mounting position.

6. The fluid quick connector of claim 1 wherein the retention clip comprises:
    a planar body having a first end fixed to the retainer, the at least one projection extending from the first end.

7. The fluid quick connector of claim 6 further comprising:
    the end of the retainer extending transverse to the housing bore; and
    at least a first leg depending from the end.

8. The fluid quick connector of claim 6 wherein the retention clip further comprises:
    a pair of side legs extending from the first end; and
    the projection formed on at least one of the first end and the side legs.

9. The quick connector of claim 8 wherein:

the projection is carried on the end of the retention clip.

10. The fluid quick connector of claim 8 wherein:

the at least one projection is carried on at least one of the side legs.

11. The fluid quick connector of claim 8 wherein:

the at least one projection comprises a plurality of projections, at least one of the plurality projections carried on each of the end and each of the side legs of the retention clip.

12. The fluid quick connector of claim 11 further comprising:

an inner end of the plurality of projections disposed at a diameter less than the outer diameter of the endform.

13. The fluid quick connector of claim 1 further comprising:

the at least one projection on the retention clip having an inner end; and the retainer mountable in the housing in a temporary mounting position allowing insertion of the endform into the bore in the housing without substantial contact between the inner end of the at least one projection and the endform.

14. The fluid quick connector of claim 1 wherein:

the at least one projection has an inner end disposed at a predetermined, non-perpendicular angle with respect to the endform.

15. The sole quick connector of claim 14 wherein:

the inner end of the at least one projection is angled toward the second end of the housing.

* * * * *